(12) United States Patent
Kushino (10) Patent No.: US 7,311,631 B2
(45) Date of Patent: Dec. 25, 2007

(54) DIFFERENTIAL DEVICE AND DRIVE POWER TRANSMISSION UNIT USING THE SAME

(75) Inventor: Hiroshi Kushino, Obu (JP)

(73) Assignee: JTEKT Corporation, Chuo-ku (JP)

( * ) Notice: Subject to any disclaimer, the term of this patent is extended or adjusted under 35 U.S.C. 154(b) by 239 days.

(21) Appl. No.: 11/248,284

(22) Filed: Oct. 13, 2005

(65) Prior Publication Data

US 2006/0079370 A1  Apr. 13, 2006

(30) Foreign Application Priority Data

Oct. 13, 2004  (JP) .............................. 2004-298577

(51) Int. Cl.
  *F16H 48/06* (2006.01)
  *F16H 3/72* (2006.01)
(52) U.S. Cl. .......................................... 475/221; 475/5
(58) Field of Classification Search .................... 475/5, 475/221, 230, 231
  See application file for complete search history.

(56) References Cited

U.S. PATENT DOCUMENTS 6,607,061 B2 *  8/2003  Hori et al. ............... 192/84.91
7,175,557 B2 *  2/2007  Kirkwood et al. .......... 475/150
7,175,558 B2 *  2/2007  Puiu et al. .................. 475/225

FOREIGN PATENT DOCUMENTS

JP  11-105573  *  4/1999
JP  3247484      11/2001

* cited by examiner

*Primary Examiner*—Ha D. Ho
(74) *Attorney, Agent, or Firm*—Oblon, Spivak, McClelland, Maier & Neustadt, P.C.

(57) ABSTRACT

The number of the teeth of a second sun gear is slightly different from that of a first sun gear. A first planetary gears mesh with both the first sun gear and the second sun gear. A first carrier supports the first planetary. The number of the teeth of a third sun gear is same as that of the first sun gear. The second planetary gears mesh with both the second sun gear and the third sun gear. The second carrier supports the second planetary gears with preventing the same from revolving. The second power source generates a torque for rotating the first carrier.

5 Claims, 6 Drawing Sheets

DIFFERENTIAL DEVICE AND DRIVE POWER TRANSMISSION UNIT USING THE SAME

INCORPORATION BY REFERENCE

This application based on and claims priority under 35 U.S.C. §119 with respect to Japanese Patent Application No. 2004-298577 filed on Oct. 13, 2004. The contents of that application are incorporated herein by reference.

BACKGROUND OF THE INVENTION

1. Field of the Invention

This invention relates to a differential device for producing difference between rotating numbers of two output elements, and to a drive power transmission unit using the same.

2. Description of the Related Art

As a conventional differential device for producing difference between rotating numbers of the two output elements, a device employing a planetary gear mechanism has been known in public as described in, for example, Japanese Patent No. 3247484. In the differential device disclosed in the Patent, torque of a electric motor is transmitted to two output elements through a planetary gear mechanism, whereby the difference generated between the two output elements can be limited or amplified.

The differential device disclosed in the aforementioned Patent, however, is provided with a gear of internal teeth type, so that it is required to machine the internal teeth and that the machining of the internal teeth is difficult in obtaining its accuracy. In the differential device disclosed in the Patent, the rotation of the motor is reduced by a gear connected between the motor and the planetary gear mechanism. Thus, a reduction ratio may be set at ⅙ approximately by that reduction mechanism, so that it may be difficult to obtain the larger reduction ratio thereby. In order to obtain sufficient torque for producing differential rotation, it may be required to improve output power of the motor or to increase the number of reduction gear element in a reducer. This improvement of the motor will cause enlargement of whole structure thereof, and the increase of gear elements in the reducer will also increase the number of parts thereof. Still further, the differential device disclosed in the Publication employs an internal gear in the planetary gear mechanism. Thus, bearings for supporting the internal gear need to be provided, whereby they cause a problem that the structure of the device is complicated.

SUMMARY OF THE INVENTION

This invention aims to provide a differential device capable of assuring the precision and prevented from enlarging a motor and the complicating the structure of the same. This invention also aims to provide a drive power transmission unit using the device.

In order to achieve the above and other objects, the present invention provides a differential device including an input shaft receiving a torque from a first power source and a differential mechanism. The differential mechanism has an input element receiving the torque of the first power source from the input shaft, a first output element, a second output element and gear elements. The gear elements distribute the torque transmitted form the torque transmitted from the input element to the two output elements with allowing the differential rotation therebetween. The differential device further includes first, second and third sun gear, first and second planetary gears, first and second carrier, and second power source. The first sun gear is connected to input element to integrally rotate with the input element and is disposed around the first output element to be coaxial with the first output element. The second sun gear is disposed around the first output element to be coaxial with the first output element, and the number of the teeth of the second sun gear is slightly different from that of the first sun gear. The first planetary gears mesh with both the first sun gear and the second sun gear. A first carrier supports the first planetary gears around the first and second sun gear with allowing the planetary gears to rotate around the center axis thereof and to revolve to go around the first and second sun gear. The third sun gear is connected to the first output element to integrally rotate with the first output element around the same axis as the first output element, and the number of the teeth of the third sun gear is same as that of the first sun gear. The second planetary gears mesh with both the second sun gear and the third sun gear. The second carrier supports the second planetary gears around the second and the third sun gear with allowing the planetary gears to rotate around the center axis thereof and with preventing the planetary gears from revolving to go around the second and third sun gears. The second power source generates a torque for rotating the first carrier around the center axis thereof.

The present invention also provides a drive power transmission unit includes the above-described differential device, a drive power transmission device, a first housing and a second housing. The differential produces and limits a differential rotation between right and left wheels of a set of front wheel or a set of rear wheels. The drive power transmission device distributes the torque from the power source to set of the front wheels and the set of rear wheels. The first housing containing the differential device and the second housing containing the drive power transmission device.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawing, in which.

DESCRIPTION OF THE PREFERRED EMBODIMENT

Plural embodiments according to the present invention will be described hereinafter with reference to figures.

Embodiment 1

Figure 1:
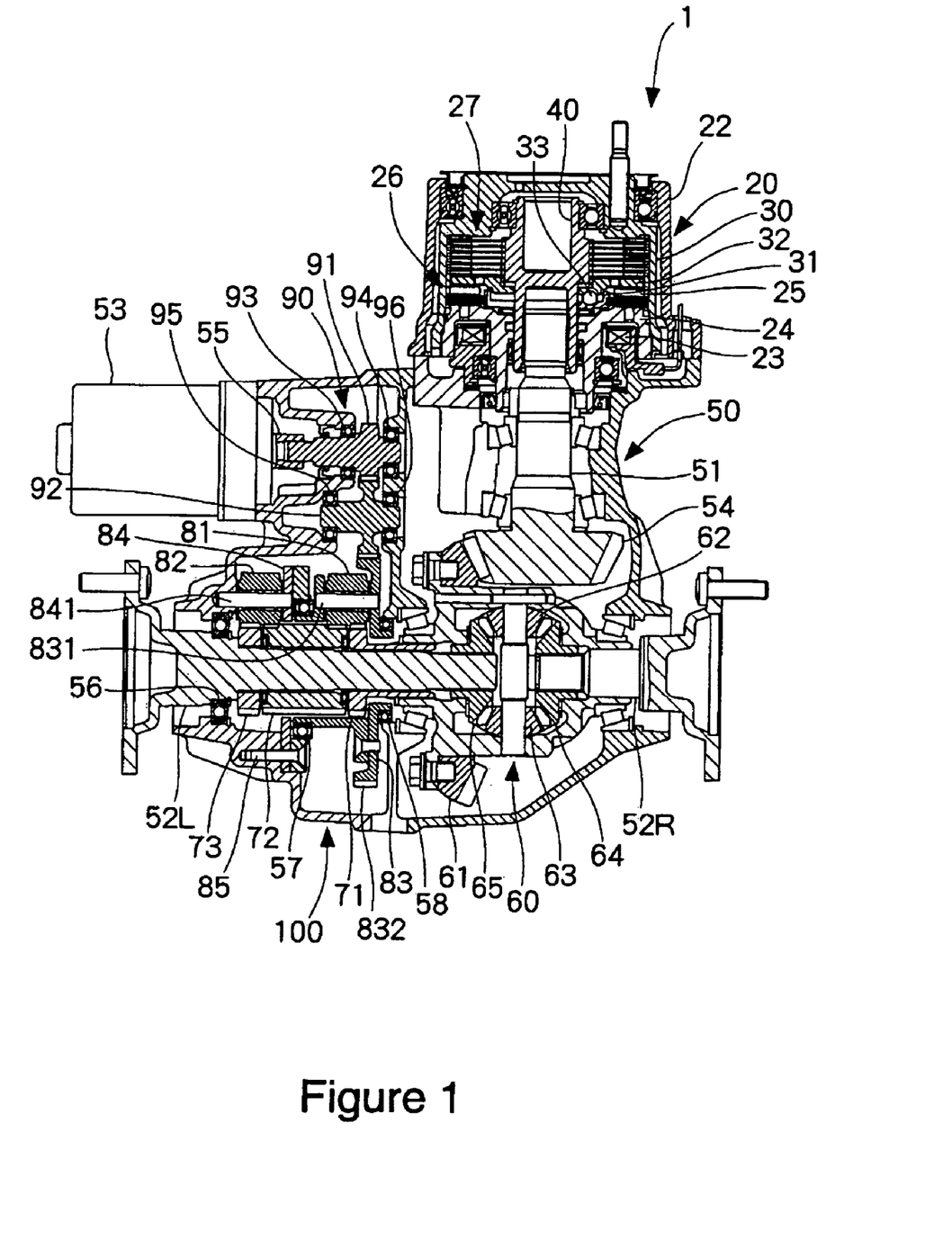
FIG. 1 is a partial cross sectional view of a drive power transmission unit provided with a differential device according to one embodiment of the present invention.
Figure 2:
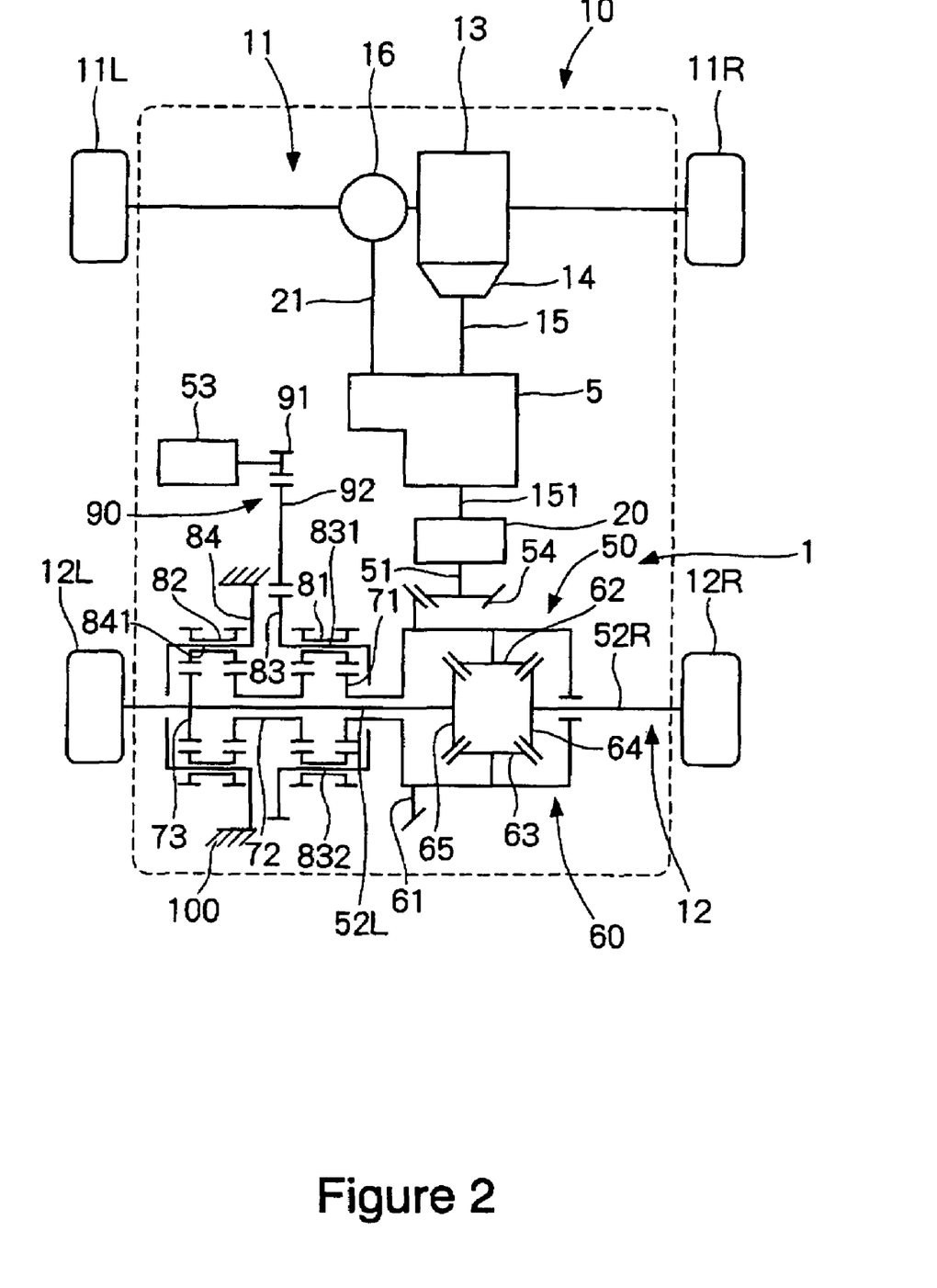
FIG. 2 is a skeleton diagram of a vehicle provided with the differential device according to the embodiment of the present invention.

FIG. 2 shows a vehicle 10 provided with a differential device 50 according to an embodiment of the present invention. The vehicle 10 shown in FIG. 2 is a four-wheel drive vehicle where torque is applied to both of a set of front wheels 11 and a set of rear wheels 12. The vehicle 10 includes an internal combustion engine (hereinafter, referred to as engine) 13 serving as a first power source, a transmission 14, a transfer 5, a drive power transmission device 20 and the differential device 50. As shown in FIG. 1, the differential device 50 and the drive power transmission device 20 are configured as an integrated drive power transmission unit 1. In the vehicle 10 of this embodiment shown in FIG. 2, the front wheels 11 consist of a front left wheel 11L and a front right wheel 11R, while the rear wheels 12 consist of a rear left wheel 12L and a rear right wheel 12R.

For example, a gasoline engine or a diesel engine can be adopted as the engine 13. An electric motor may be also adopted in place of the engine 13 as the first power source. The engine 13 generates torque for driving the front wheels 11 and the rear wheels 12. The torque generated by the engine 13 is regulated in the transmission 14 to be transmitted to the transfer 5 through a drive shaft 15. The transfer 5 distributes the torque input from the drive shaft 15 to an input shaft 21 and a propeller shaft 151. The torque output from the transfer 5 is transmitted via the input shaft 21 to a side of the front wheels 11 and is also input to the drive power transmission device 20 through the propeller shaft 151.

The torque transmitted from the transfer 5 through the input shaft 21 to a direction of the front wheels 11 is distributed to the front left wheel 11L and the front right wheel 11R by a front differential mechanism 16. In this embodiment, the torque input from the input shaft 21 to the front left wheel 11L and the front right wheel 11R is equally distributed by the front differential mechanism 16. For example, a limited slip differential mechanism can be adopted as an alternative of the front differential mechanism 16 so as to limit differential rotation between the front left wheel 11L and the front rear wheel 11R. The torque received by the drive power transmission device 20 is electrically controlled, as described later, to be transmitted to an input shaft 51.

As shown in FIG. 1 and FIG. 2, the differential device 50 is installed in the vehicle 10 at the side of the rear wheels 12. The differential device 50 includes the input shaft 51, a rear differential mechanism 60, a left output shaft 52L, a right output shaft 52R, a first sun gear 71, a second sun gear 72, a third sun gear 73, first planetary gears 81, second planetary gears 82, a first carrier 83, a second carrier 84, a reducer 90, a motor 53 serving as a second power source, and a casing 100. The input shaft 51 is interposed between the drive power transmission device 20 and the rear differential mechanism 60 to connect each other so that the torque generated by the engine 13 and output from the drive power transmission device 20 is transmitted to the rear differential mechanism 60. In this embodiment, the left output shaft 52L corresponds to a first output element in claims, and the right output element serves as a second output element.

The rear differential mechanism 60, that is a known differential mechanism, includes a bevel gear 61 which is meshed with a drive pinion gear 54 provided on the input shaft 51 at an opposite end portion with respect to the portion connected to the drive power transmission device 20. The bevel gear 61 corresponds to an input element in claims. The rear differential mechanism 60 includes gear elements constituted by plural gears 62, 63, 64 and 65 to distribute the torque transmitted from the bevel gear 61 to each of the left output shaft 52L and right output shaft 52R. The left output shaft 52L transmits the torque input thereto to the rear left wheel 12L, while the right output shaft 52R transmits the torque input thereto to the rear right wheel 12R.

The first sun gear 71 is connected to the bevel gear 61 by way of the spline-meshing so as to coaxially rotate together with and the bevel gear 61. The sun gear 71 is disposed around the left output shaft 52L to be coaxial with the bevel gear 61 and the left output shaft 52L. The sun gear 71 meshes with the first planetary gear 81 at the end portion being opposite to the bevel gear 61. The first sun gear 71 is not in contact with the left output shaft 52L to rotate together with the bevel gear 61 and independently from the left output shaft 52L. The sun gear 71 is gear of external teeth type.

The second sun gear 72 is disposed between the first sun gear 71 and the third sun gear 73. The second sun gear 72 is disposed around the left output shaft 52L to be coaxial with the left output shaft 52L. In the same manner as the first sun gear 71. The second sun gear 72 rotates independently from the left output shaft 52L in the same manner as the first sun gear 71. The number of teeth of the second sun gear 72 is slightly different from that of the first sun gear 71. The difference between the numbers of teeth formed on the first and second sun gears 71, 72 is set within a range from one to three. The third sun gear 73 is spline-meshed with the left output shaft 52L to integrally rotate with the left output shaft 52L. Alternatively, the third sun gear 73 can be formed integrally with the left output shaft 52L. The number of teeth of the third sun gear 73 is same as that of the first sun gear 71. The second sun gear 72 and third sun gear 73 are gears of external teeth similar type to the first sun gear 71.

Each of the first planetary gears 81 meshes with the first sun gear 71 and the second sun gear 72. Each of the second planetary gears 82 meshes with the second sun gear 72 and the third sun gear 73. The first planetary gears 81 and second planetary gears 82 are gears of external teeth type. The first planetary gears 81 are supported by a support shaft 831 of the first carrier 83. The first carrier 83 is rotatable about the center axis thereof in its circumferential direction, the axis of which coaxial with those of the left output shaft 52L, the first sun gear 71 and the second sun gear 72. The first carrier 83 supports the first planetary gears 81 with allowing their rotation about center axes thereof. Thus, each of the first planetary gears 81 can rotate about its center axis thereof with surrounding the first sun gear 71 and the second sun gear 72, and can also revolve to go around the sun gears. The first carrier 83 has, at an outer periphery thereof, a gear portion 832 for meshing with the reducer 90.

The second planetary gears 82 are supported by a support shaft 841 of the second carrier 84. The second carrier 84 supports the second planetary gears 82 with allowing their rotation about center axes thereof. The second carrier 84 is fixed to the casing 100 by means of bolts 85. Thus, the second planetary gears 82 are prevented from revolving to go around the sun gears while the second carrier 84 supports the planetary gears 82 to be able to rotate about the center axes thereof.

The reducer 90 includes pinion gears 90 and 91. The pinion gear 91 is rotatably supported by the casing 100 via bearings 93 and 94. The pinion gear 92 is rotatably supported by the casing 100 through bearings 95 and 96. The pinion gear 91 is connected to a rotational shaft of the motor 53 to rotate in tandem therewith. The pinion gear 92 meshes with the pinion gear 91 and the gear portion 832 of the first carrier 83. Thus, the torque generated by the motor 53 is transmitted to the first carrier 83 through the pinion gears 91 and 92.

The motor 53, which is a known direct current motor and is fixed to the casing 100, is driven in the forward and backward rotational directions in response to electric power supplied from a controller (not shown). The casing 100 houses the differential device 50 configured by parts such as the input shaft 51, the rear differential mechanism 60, the first sun gear 71, the second sun gear 72, the third sun gear 73, the first planetary gears 81, the second planetary gears 82, the first carrier 83, the second carrier 84, the reducer 90, the motor 53 and the like. Further, the casing 100 rotatably supports the left output shaft 52L through a bearing 56. The casing 100 also rotatably supports the first carrier 83 through bearings 57 and 58. The motor 53 is not limited to the direct current motor, and may be constituted by an alternate current motor or a brushless direct current motor.

The drive power transmission device 20 is accommodated by a cover 22 which is integrally fixed with the casing 100 of the differential device 50. The drive power transmission device 20 includes a coil 23 for generating magnetic field in response to current supply and an armature 25 attracted toward a yoke 24 due to the generated magnetic field. When the armature is attracted toward the yoke 24, a pilot clutch 26 is brought into engaging state. The pilot clutch 26 includes outer pilot clutch plates spline-meshing with an outer rotary member 30 and inner pilot clutch plates spline-meshing with a first cam member 31. The first cam member 31 faces with a second cam member 33 with interposing balls 32 therebetween. The second cam member 33 spline-meshes with an inner rotary member 40. In this situation, when the pilot clutch 26 is brought into engaging state by the current supply to the coil 23, the relative rotation is generated between the first cam member 31 engaged with the outer rotary member 30 through the pilot clutch 26 and the second cam member 33 meshed with the inner rotary member 40.

Since the balls 32 are interposed between the first cam member 31 and the second cam member 33, rotating force caused by the relative rotation is converted into thrust force, that is force in an upward direction in FIG. 1. Thus, the second cam member 33 moves upwardly in FIG. 1, whereby a main clutch 27 frictionally engages. The main clutch 27 includes outer main clutch plates spline-meshing with the outer rotary member 30 and inner main clutch plates spline-meshing with the inner rotary member 40. With this configuration, in the drive power transmission device 20, the engaging force of the pilot clutch 26 is adjusted by controlling the electric power applied to the coil 23, whereby that of the main clutch 27 is also adjusted. The outer rotary member 30 spline-meshes with propeller shaft 151 for transmitting torque. On the other hand, the inner rotary member spline-meshes with the input shaft 51 for transmitting torque to rear wheels 12. As a result, torque transmitted from the engine to the front wheels 11 and rear wheels 12 is electrically controlled by controlling the electric power applied to the coil 23.

Next, operation of the differential device 50 will be described in detail.

As described above, the number of the teeth of the first sun gear 71 is slightly different from that of the second sun gear 72. The first planetary gears 81 meshes with respect of the first sun gear 71 and the second sun gear 72. Thus, when the first sun gear 71 and the second sun gear 72 rotate once (360 degree) at the same rotational velocity, the first planetary gears 81 revolve to go around the first sun gear 71 and the second sun gear 72 by the degree corresponding to the difference between the numbers of the first and second sun gears 71 and 72. Thus, the first carrier 83 produces large reduction ratio with respect to the first and second sun gears 71 and 72.

When the vehicle 10 is traveling straight, that is, when difference in the rotating number between the left output shaft 52L and the right output shaft 52R does not occur, torque input to the input shaft 51 is equally distribute to the left output shaft 52L and the right output shaft 52R by the operation of the rear differential mechanism 60. In this case, the number of the teeth of the first sun gear 71 rotating with the bevel gear 61 of the rear differential mechanism 60 is same as that of the third sun gear 73 rotating in tandem with the left output shaft 52L. Therefore, the first sun gear 71 and the third sun gear 73 rotate at the same rotational velocity. The first planetary gears 81 and the second planetary gears 82 are same in the number of the teeth. Thus, the first planetary gears 81 meshing with the first sun gear 71 and the second planetary gears 82 meshing with the third sun gear 73 rotate at the same rotational velocity. Therefore, in case that relative rotation occurs between the first sun gear 71 and the second sun gear 72, the occurred relative rotation is absorbed or canceled by relative rotation between the second sun gear 72 and the third sun gear 73. As a result, the first planetary gears 81 and the second planetary gears 82 rotate at the same rotational velocity as well as the first sun gear 71 and the third sun gear 73, whereby the first carrier 83 does not rotate. Since the first carrier 83 does not rotate, the pinion gear 92 of the reducer 90, which meshes with the first carrier 83, the pinion gear 91 and the motor 53 do not rotate.

When the vehicle 10 turns with traveling, in order to assist the turning of the vehicle 10, distribution ratio between the torque transmitted to the left output shaft 52L and the torque transmitted to the right output shaft 52R is varied by the torque generated by the motor 53. Specifically, a rotation shaft 55 rotates in response to current supply for the motor 53. Thus, the torque generated by the motor 53 is transmitted to the carrier 83 through the pinion gears 91 and 92. The first carrier 83 rotates due to the torque transmitted from the motor 53. On the other hand, the second carrier 84 is fixed to the casing 100. This causes the relative rotation between the first carrier 83 and the second carrier 84.

In this case, since the number of the teeth of the first sun gear 71 is slightly different from that of the second sun gear 72, the first planetary gears 81 meshing with both of the first sun gear 71 and the second sun gear 72 produces large reduction ratio. In the present embodiment, the difference between the numbers of the teeth of the first sun gear 71 and the second sun gear 72 is set within the range from one in the minimum to three in the maximum. As the difference between the numbers of the teeth of the first sun gear 71 and second sun gear 72 become smaller, the reduction ratio increases. For the meanwhile, in case that no difference of the number of teeth is provided between the first sun gear 71 and second sun gear 72, speed reduction effect is not produced. Thus, the difference between the numbers of the teeth of the first sun gear 71 and the second sun gear 72 is set within the range from one to three.

For example, the number of the teeth of the first sun gear 71 is set to be thirty three (33), the number of the teeth of the second sun gear 72 is set to be thirty two (32) and the number of the teeth of the first planetary gear 81 is set to be eighteen (18), then the reduction ratio becomes large, i.e. one thirty third (1/33). Therefore, it is not needed to ensure large reduction ratio between the pinion gears 91 and 92, which configure the reducer 90. Further, the large reduction ratio allows the motor to reduce generating torque. Thereby, large motor is not needed.

When the relative rotation occurs between the first carrier 83 and the second carrier 84, revolving number difference is generated between the first planetary gear 81 and the second planetary gear 82. Then, rotating number difference is also generated between the first sun gear 71 and the third sun gear 73, which are meshed with the first planetary gear 81 and the second planetary gear 82 respectively. As a result, difference of distributed torque is produced between the right output shaft 52R receiving torque transmitted from the first sun gear 71 and the left output shaft 52L receiving torque transmitted from the third sun gear 73 in dependence on the rotating number.

For example, in case that the rotational velocity of the right output shaft 52R is equal to that of the left output shaft 52L with vehicle 10 traveling straight, and that current is not supplied to the motor 53, the torque inputted from the engine to the rear differential mechanism 60 is equally distributed to each of the right output shaft 52R and the left output shaft 52L. Assuming that the torque transmitted to the rear differential mechanism 60 is ten (10), ratio of the torque distributed to the right output shaft 52R and the left output shaft 52L is expressed as 5:5. On the other hand, when the motor 53 is driven to generate torque, the torque operate to increase the torque distributed to one output shaft and to decrease the torque distributed to the other output shaft. Assuming that the torque inputted from the motor 53 to the first carrier 83 is two (2), ratio of the torque distributed to the right output shaft 52R and the left output shaft 52L is expressed as 6:4 or 4:6. Thus, torque distributed to the rear left wheel 12L and torque distributed to the rear right wheel 12R are set to be uneven each other in the early stage of the whirling motion of the vehicle 10, so that the vehicle 10 whirls smoothly. At this moment, torque distributed to the left output shaft 52L and torque distributed to the right output shaft 52R are replaced by changing rotating state of the motor 53 between forward direction and the backward direction.

In addition to the state in which the vehicle is 10 whirling, torque can be also output from the motor 53 when the vehicle 10 is traveling straight. This make torque distributed to the left output shaft 52L be maintained equally to torque distributed to the right output shaft 52R, so that the vehicle 10 is stabilized to traveling straight. Further, another configuration can be acceptable. For example, when differential rotation is occurred between the left output shaft 52L and the right output shaft 52R, the differential rotation is absorbed by the motor 53 being function as a generator, so that the vehicle 10 is stabilized to traveling straight.

In this embodiment, the first planetary gear 81 meshes with both of the first sun gear 71 and the second sun gear 72 whose number of the teeth is slightly different from that of the first sun gear 71, whereby large reduction ratio can be achieved. Therefore, multistage configuration of the reducer 90 and increase of output of the motor 53 are not required. Accordingly, downsizing of the body of the differential device 50 can be achieved. Further, the first sun gear 71, the second sun gear 72, the first planetary gear 81, the first carrier 83 or the like are gear of external teeth type. Thus, these gears are facilitated in assuring the precision as compared to a gear of internal teeth type and in means for supporting the same. Accordingly, high precision can be secured without requiring complex configuration and increase of the number of parts.

Further, in the embodiment, the first carrier 83, the reducer 90 and the motor 53 does not rotate or operate when vehicle 10 is traveling straight, that is when the differential rotation is not occurred between the left output shaft 52L and the right output shaft 52R. Further, the first sun gear 81 rotates about its center axis thereof and does not revolve to go around the sun gears. Therefore, when the vehicle 10 is traveling straight, rotating number of each gear becomes small. Therefore, load of the bearings for supporting the gears is reduced, thereby enhancing durability and reliability of the bearings. Also, the number of the rotating elements is decreased to reduce friction generated on rotating part, so that transmission efficiency can be improved.

Still further, in the embodiment, torque of the motor 53 is transmitted to the first planetary gear 81 via the reducer 90 and the first carrier 83, and then is transmitted from the first planetary gear 81 to both of the first sun gear 71 and the second sun gear 72. The torque transmitted to the second sun gear 72 is transmitted to the left output shaft 52L via the second planetary gear 82 and third sun gear 73, while the torque transmitted to the first sun gear 71 is transmitted to the gears 62, 63, 64 and 65 of the rear differential mechanism 60. Thus, when the motor 53 is driven to actively generate differential rotation between right and left rear wheels, the rear differential mechanism 60 adequately adjust rotational directions of the left output shaft 52L and the right output shaft 52R and adjust torque transmitted to the output shafts. Accordingly, differential rotation between right and left wheels can be generated with simple configuration. Further, when current is not supplied to the motor 53, the differential device 50 carries out a function same as a conventional differential device. In other words, the differential device 50 transmits drive power with allowing differential rotation between the right and left wheels during the whirling of the vehicle.

Figure 3:
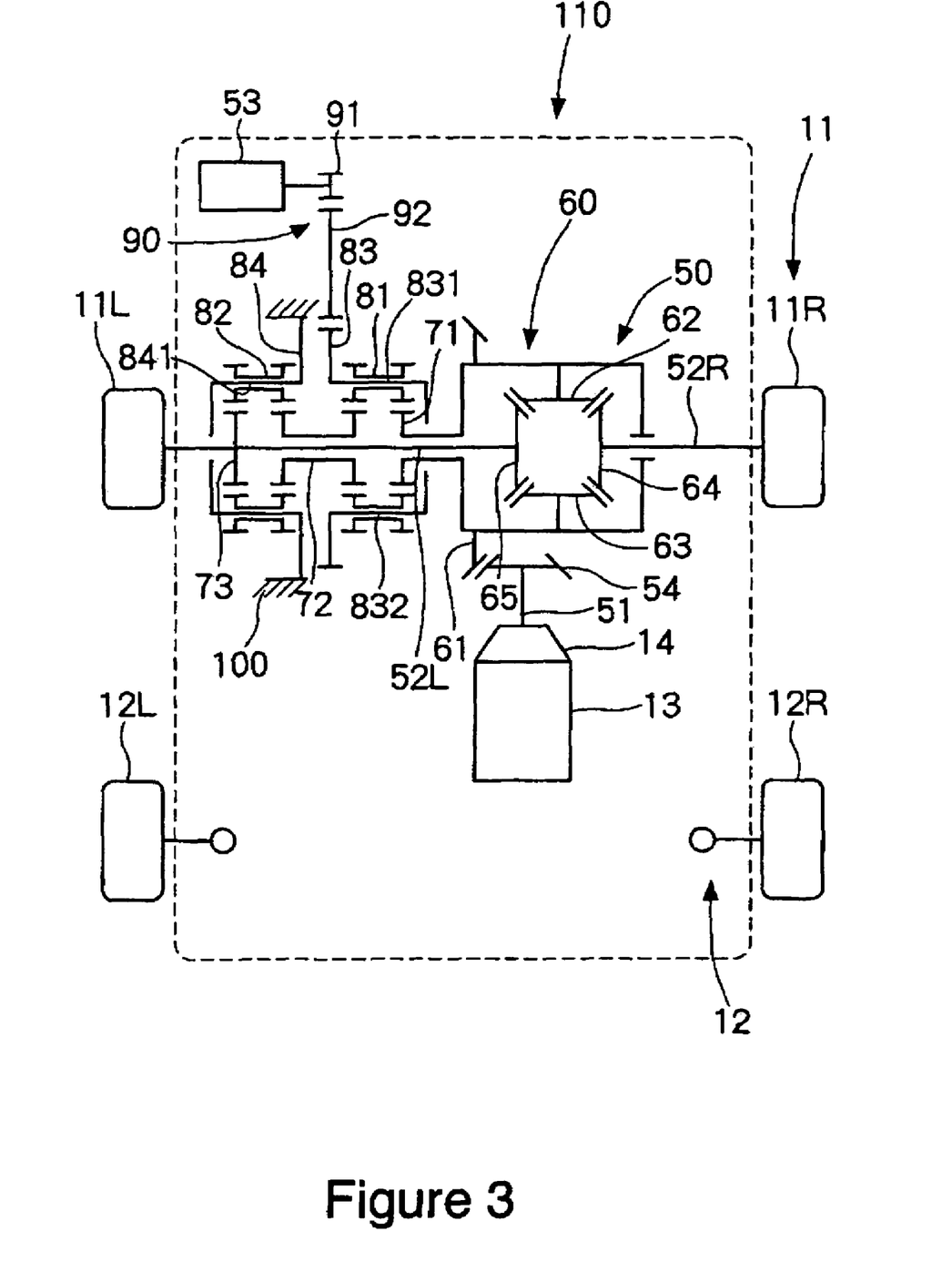
FIG. 3 is a skeleton diagram of a front wheel drive vehicle provided with the differential device according to the embodiment of the present invention.

In the aforementioned embodiment, the differential device 50 is connected to rear wheels 12 of the four-wheel drive vehicle. However, the differential device can be connected to front wheels 11 of a front-wheel drive vehicle 110 as shown in FIG. 3.

Figure 4:
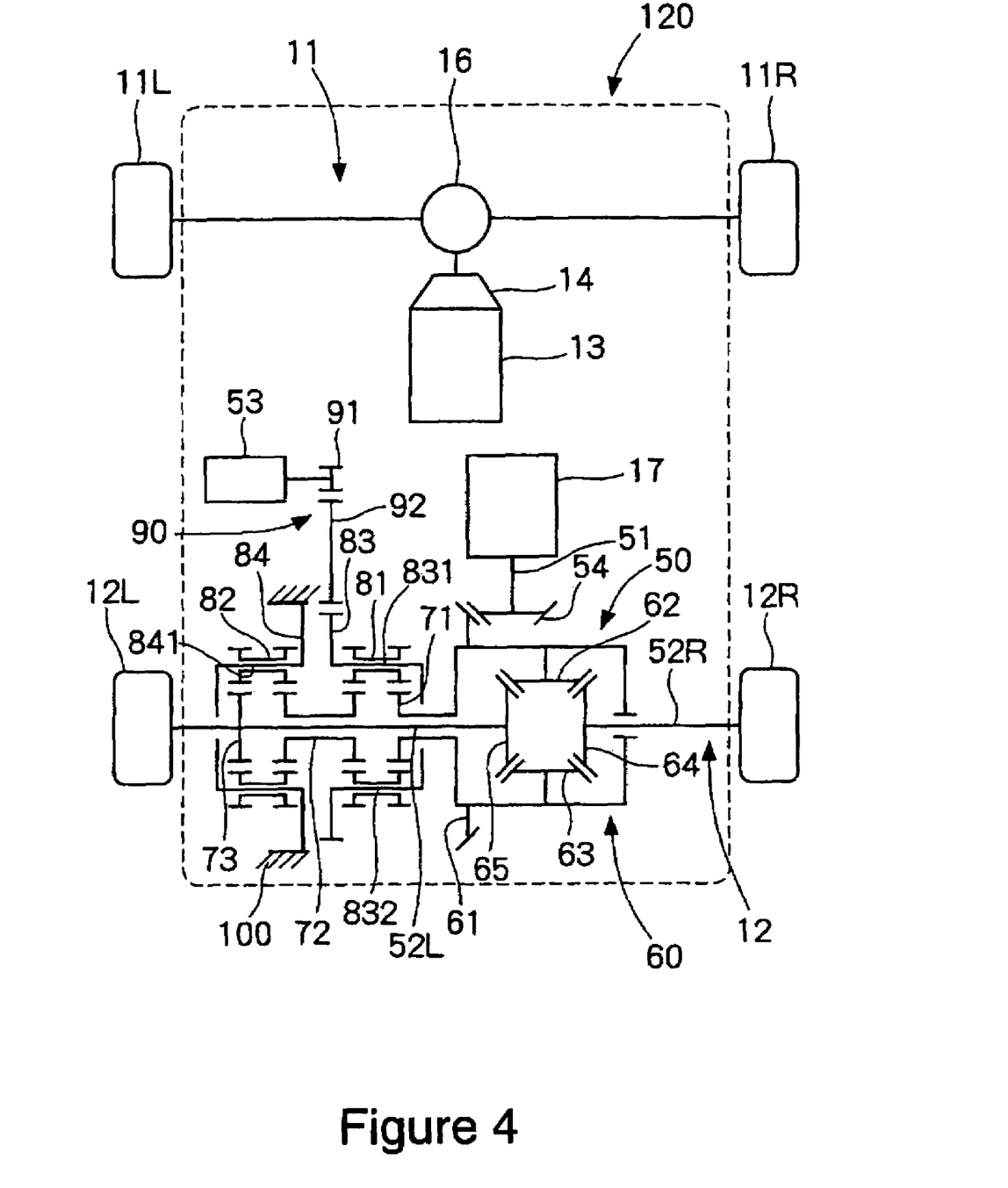
FIG. 4 is a skeleton diagram of a hybrid vehicle provided with the differential device according to the embodiment of the present invention.

Further, the differential device 50 is applicable to a hybrid-type vehicle which includes the engine 13 and electric motor 17 serving as another first power source as shown in FIG. 4. In this case, torque is transmitted from the electric motor 17 to the differential device 50 provided on the side of rear wheels 12. On the other hand, the front wheels 11 receive torque from the engine 13.

Embodiment 2

Figure 5:
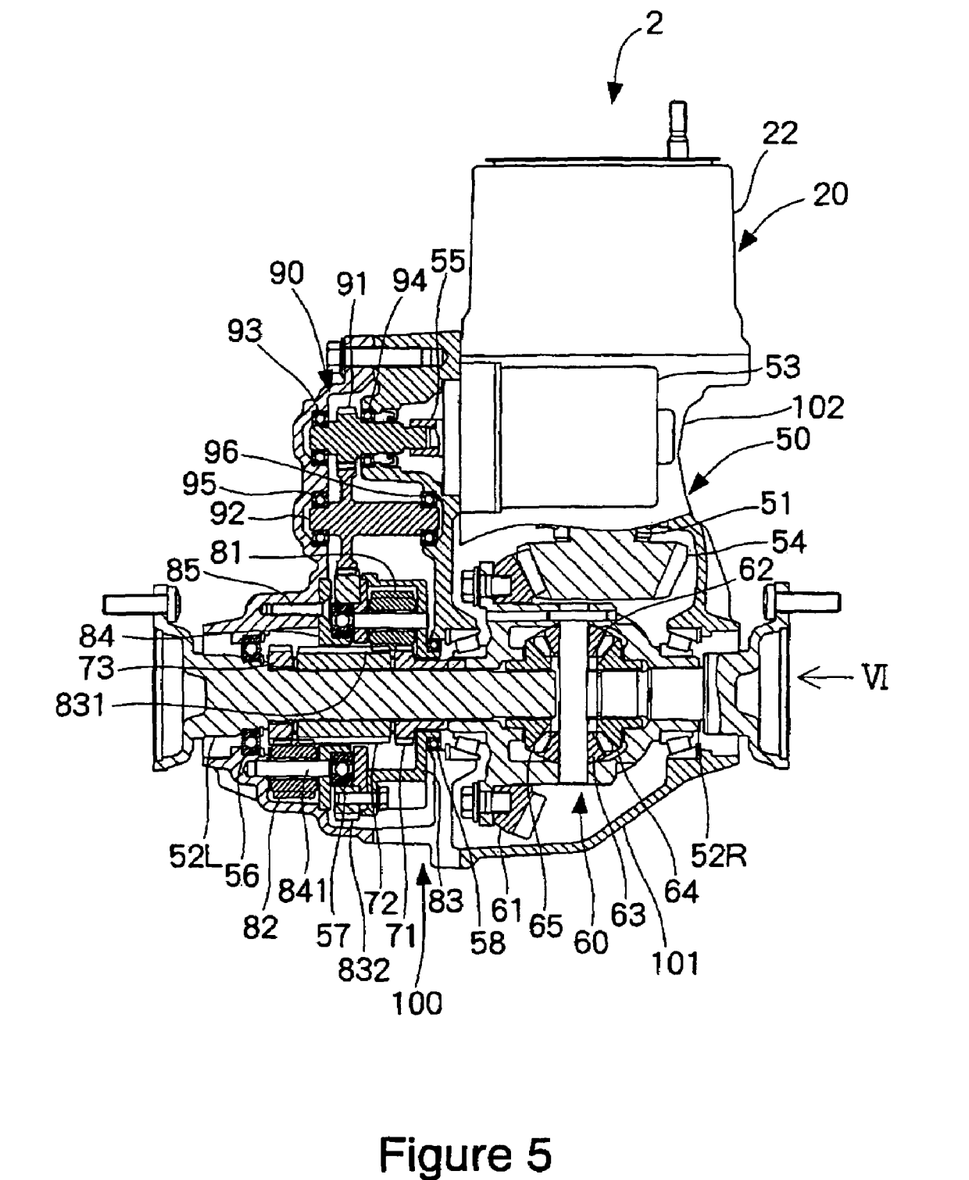
FIG. 5 is a partial cross sectional view of a drive power transmission unit provided with a differential device according to another embodiment of the present invention.
Figure 6:
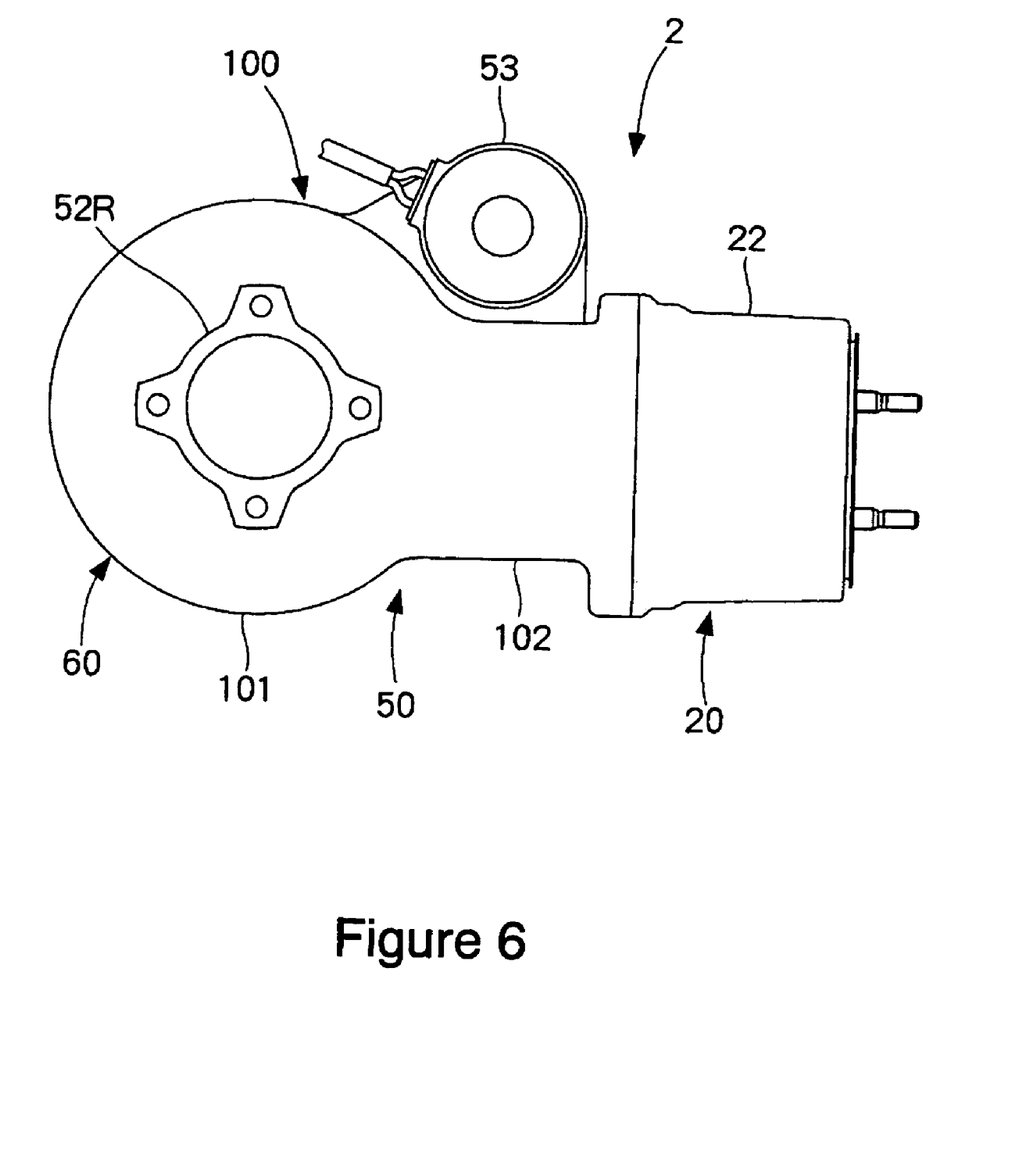
FIG. 6 is a view shown from arrow VI in FIG. 5.

A differential device 50' according to another embodiment of the present invention is shown in FIGS. 5 and 6. Substantially same portions as the former embodiment are indicated by the same reference number as that of the former embodiment, and explanations for the same portions are omitted.

As shown in FIGS. 5 and 6, this embodiment is different from the former embodiment in an arrangement of a motor 53'. Configuration of the other parts is same as the former embodiment. The motor 53' is arranged between the differential device 50' and the drive power transmission device 20. The differential device 50' and the drive power transmission device 20 configure an integrated drive power transmission unit 2. The drive power transmission unit 20 includes the casing 100 corresponding to a first housing which houses the differential device 50' and the cover 22 corresponding to a second housing which houses the drive power transmission device 20. The casing 100 is provided with a large diameter portion 101 for housing the rear differential mechanism 60 and a small diameter portion 102 for housing the input shaft 51. Since the input shaft 51 is a shaft-like part connecting the drive power transmission device 20 with the differential device 50', an outer diameter of the portion containing the input shaft 51 in the casing 100 become small. In other words, in the casing 100, the portion containing the input shaft 51 is smaller than the portion containing the rear differential mechanism 60 in outer diameter.

Outer diameter of the cover 22 containing the drive power transmission device 20 is same as that of the large diameter portion 101 of the casing 100. Therefore, the small diameter portion 102 caved in radial direction is formed between the cover 22 and the large diameter portion of the casing 100. In the drive power transmission unit 2 of this embodiment, the motor 53' is arranged at the side of the small diameter portion 102 in lateral direction. In case that the drive power transmitting unit 2 is mounted on the vehicle 10, a certain space is provided between the drive power transmitting unit 2 and a chassis (not shown in figures) of the vehicle 10. By arranging the motor 53' on the small diameter portion 102, the motor 53' is accommodated between the small diameter portion 102 and the chassis. As a result, space to be occupied by the drive power transmission unit 2 is reduced in the lateral direction, i.e., axle direction, as compared to the drive power transmission unit 1 of the former embodiment. Thus, space required to mount the drive power transmission unit 2 is reduced.

Further, in this embodiment, the motor 53' is accommodated between the drive power transmission unit 2 and the chassis. Accordingly, the motor 53' is arranged on upper side of the differential device 50 in the direction of gravity. Since the drive power transmission unit 2 is provided under the chassis, spattered dust and protrusion from road surface tend to collide with the drive power transmission device 20. By arranging the motor 53' on upper side of the differential device 50, the dust or the like is prevented form colliding with the motor 53'. Thus, the durability of the motor 53' can be enhanced.

In the above plural embodiments, the first planetary gear 81 has integrated teeth portion meshing with both of the first sun gear 71 and the second sun gear 72, and the second planetary gear 82 has integrated teeth portion meshing with both of the second sun gear 72 and the third sun gear 73. However, the teeth portion of the first planetary gear 81 can be divided in the axial direction into a first teeth portion meshing with first sun gear 71 and a second teeth portion meshing with the second sun gear 72. The teeth portion of the second planetary gear 82 can be divided in the axial direction into a first teeth portion meshing with second sun gear 72 and a second teeth portion meshing with the third sun gear 73. With this configuration, the first and second teeth portions of the first planetary gear 81 and the second planetary gear 82 mesh with the corresponding teeth portions of the sun gears respectively. Thus, meshing state of the gears is improved, whereby transmission efficiency of torque can be enhanced.

Further, the plural embodiments is explained with examples in which the reducer 90 is provided between the first carrier 83 and the motor 53 (53') serving as the second power source. However, it is also applicable to directly transmit torque from the motor 53 (53') to the first carrier 83 by employing a direct drive type motor.

The first sun gear and the second sun gear, which are meshing with the first planetary gear, are slightly different from each other in the number of the teeth. Therefore, when the first planetary gear rotates about its center axis and revolves to go around the sun gears, relative rotation between the first sun gear and the second sun gear occurs. As a result, the first carrier supporting the first planetary gear receives the rotation whose rotational velocity is largely reduced. Thus, when differential rotation occurs between two output elements, required torque of the second power source for driving the first carrier is reduced. Therefore, the second power source for driving the first carrier is prevented from having large body and complicated configuration. Further, in case that the reducer for transmitting the torque of the second power source is provided between the first carrier and the second power source, a multistage reducer is not required, thereby making body size of the drive power transmission unit smaller.

In addition, the first sun gear, the first planetary gear, the second sun gear, second planetary gear, and third sun gear are configured by gears of external teeth type. Accordingly, these gears are easily machined as compared to a gear of internal teeth type or a gear which includes both of internal teeth and external teeth. These gears also can assure high precision without difficulty.

Further, the second sun gear meshes with the first sun gear via the first planetary gear and with the third sun gear, which rotates with the first output element, via the second planetary gear. The number of the teeth of the third sun gear is same as that of the first sun gear. In a case that the number of the teeth of the first planetary gears are set to be same as that of the second planetary gears, when differential rotation is not occurred between the two output elements, the first planetary gears and the second planetary gears do not revolve to go around the sun gears. Thus, the first carrier, the reducer meshing with the first carrier, and the second power source does not rotates. As a result, when differential rotation does not occurs, the number of the rotating elements is decreased, thereby making load applied to the first carrier and the reducer smaller. Further, unless differential rotation occurs between the two output elements, the second power source need not rotate when the input shaft, first output element and second output element rotates. Accordingly, reliability and durability are enhanced, and load on the first and second power source is reduced.

Difference between the numbers of the teeth of the first sun gear and the second sun gear are set within the range from one to three, thereby aquirering large reduction ratio.

Since the second carrier is fixed to the casing, the second carrier supporting the second planetary gears is prevented from revolving to go around the sun gears without complicated configuration and increase of the number of parts.

In a case that the drive power transmission unit is configured by the differential device and the drive power transmission device, the first housing containing the differential device and the second housing containing the drive power transmission device are integrally connected to each other. In this case, the rear differential mechanism and the drive power transmission device have relatively large diameter as compared to the input shaft. In other words, the small diameter portion having relatively small diameter is provided between the rear differential mechanism of the differential device and the drive power transmission device. By arranging the second power source at this small diameter portion, dead space defined between the differential device and the power transmission device is effectively used. Thus, the second power source does not outwardly protrudes from the housing in the lateral direction, so that space required to mount the drive power transmission unit is made small. Further, by arranging the second power source at the upper side of the small diameter portion in the direction of the gravity, the second power source is allocated among the differential device, the power transmission device and the vehicle body. Accordingly, lower side portion of the second power source is protected by the differential device and the power transmission device so that dust thrown up by the wheel or the like is prevented from colliding with the second power source. As a result, durability and the reliability are enhanced.

The embodiment described herein is to be regarded as illustrative rather than restrictive. Plural objectives are achieved by the present invention, and yet there is usefulness in the present invention as far as one of the objectives are achieved. Variations and changes may be made by others, and equivalents employed, without departing from spirit of the present invention. Accordingly, it is expressly intended that all variations, changes and equivalents which fall within the spirit and scope of the present invention as defined in the claims, be embraced thereby.

I claim:

1. A differential device comprising;
    an input shaft receiving a torque from a first power source;
    a differential mechanism having
        an input element receiving the torque from the first power source through the input shaft,
        a first output element,
        a second output elements, and
        gear elements for distributing the torque transmitted from the input element to the two output elements with allowing the differential rotation therebetween;
    a first sun gear connected to the input element to integrally rotate with the input element and disposed around the first output element to be coaxial with the first output element;
    a second sun gear disposed around the first output element to be coaxial with the first output element, wherein the number of the teeth of the second sun gear is slightly different from that of the first sun gear;
    first planetary gears meshing with both the first sun gear and the second sun gear;
    a first carrier supporting the first planetary gears around the first and second sun gears with allowing the planetary gears to rotate around its center axis and to revolve to go around the first and second sun gears;
    a third sun gear connected to the first output element to integrally rotate with the first output element around the same axis as the first output element, wherein the number of the teeth of the third sun gear is same as that of the first sun gear;
    second planetary gears meshing with both the second sun gear and the third sun gear;
    a second carrier supporting the second planetary gears around the second and the third sun gears with allowing the planetary gears to rotate around its center axis and with preventing the planetary gears from revolving to go around the second and third sun gears; and
    a second power source generating a torque for rotating the first carrier around its center axis.

2. A differential device according to claim 1, wherein difference between the numbers of the teeth of the first and second sun gear is set within the range from one to three.

3. A differential device according to claim 1, further including a casing containing the first output element, the first sun gear, the first planetary gear, the first carrier, the second sun gear, third sun gear and the second planetary gear, wherein the second carrier is fixed to the casing.

4. A drive power transmission unit comprising;
    a differential device according to claim 1 wherein the differential device produces and limits a differential rotation between right and left wheels of a set of front wheels or a set of rear wheels;
    a drive power transmission device distributing the torque from the first power source to the set of the front wheels and the set of rear wheels;
    a first housing containing the differential device; and
    a second housing containing the drive power transmission device.

5. A drive power transmission unit according to claim 4 wherein, the first housing is provided with a small diameter portion at a portion in which the input shaft is accommodated, the outer diameter of the small diameter portion is smaller than that of a portion accommodating the differential mechanism, and the second power source is arranged on the upper side of the small diameter portion in the direction of the gravity.

* * * * *